United States Patent

[11] 3,619,105

| [72] | Inventor | John R. Caldwell |
|---|---|---|
| | | Kingsport, Tenn. |
| [21] | Appl. No. | 669,726 |
| [22] | Filed | Sept. 22, 1967 |
| [45] | Patented | Nov. 9, 1971 |
| [73] | Assignee | Eastman Kodak Company |
| | | Rochester, N.Y. |
| | | Continuation-in-part of application Ser. No. 319,990, Nov. 30, 1963, now Patent No. 3,432,472, dated Nov. 9, 1971. |
| | | The portion of the term of the patent subsequent to Mar. 11, 1986, has been disclaimed. |

[54] CELLULOSE ESTER FIBER WITH D,HEXYL SODIUM SULFOSUCCINATE THEREIN AND DYEING THEREOF
8 Claims, No Drawings

[52] U.S. Cl. .................................................. 8/31, 8/100, 8/165, 8/168, 106/196, 264/78
[51] Int. Cl. ..................................................... D06p 1/36
[50] Field of Search ............................................. 8/168, 100, 31; 264/78; 106/196

[56] References Cited
UNITED STATES PATENTS

| 2,104,722 | 1/1938 | Bertsch | 106/196 |
|---|---|---|---|
| 2,071,024 | 2/1937 | Clark | 264/78 |
| 2,100,398 | 11/1937 | Kline | 264/78 |
| 2,127,236 | 8/1938 | Schlack | 8/168 |
| 2,238,949 | 4/1941 | Schlack | 8/100 |
| 3,300,272 | 1/1967 | Robinson | 8/100 |
| 3,314,743 | 4/1967 | Gagliardi | 8/100 X |
| 3,432,472 | 3/1969 | Caldwell | 260/75 (P) |

*Primary Examiner*—Donald Levy
*Attorneys*—William T. French and William P. Heath, Jr.

ABSTRACT: Cellulose ester compositions having dispersed therein a salt having the structure R-X-M where R is an organic radical; X is an acid radical containing phosphorus or sulfur and having a dissociation constant of about $1 \times 10^{-3}$ or higher; and M is an ion derived from a metal or amine. The cellulose ester compositions so modified are easily dyed with cationic dyes to obtain bright, vivid color which has excellent fastness toward light, laundering and drycleaning. Also disclosed is a process for preparing a fiber dyed with cationic dyes.

CELLULOSE ESTER FIBER WITH D,HEXYL SODIUM SULFOSUCCINATE THEREIN AND DYEING THEREOF

This application is a continuation-in-part of Ser. No. 319,990, filed Oct. 30, 1963 now U.S. Pat. No. 3,432,472.

This invention relates to the manufacture of improved cellulose ester compositions, fibers, films, and other shaped articles which have an increased affinity for basic dyes. More particularly, the invention encompasses the incorporation of certain salts in cellulose esters prior to spinning, extruding or other shaping operations.

It is well known that cellulose esters cannot be dyed to practical shades with cationic or basic dyes. Some cationic dyes will color or tint cellulose acetate fibers to light shades but the fastness toward light, laundering and dry cleaning is generally poor.

Cellulose acetate, for example, is normally dyed with the so-called disperse dyes which have good fastness properties. However, in general, the colors obtained are somewhat dull and only in a few cases can bright shades be obtained.

The use of basic dyes on cellulose ester fibers is of particular importance because the colors obtained from use of cationic dyes are especially bright, and in some cases even vivid. For certain desirable textile uses it is of major importance to have bright, vivid color. Sheets, films and molded articles made from cellulose esters are useful for making signs, signalling devices, novelties, etc. and therefore present a wide field of usage for bright vivid colors.

Thus, it is apparent that a real need exists for a cellulose ester composition that has a ready affinity for cationic dyes and which can be spun, extruded or molded into useful shapes and articles.

Accordingly, it is an object of this invention to provide cellulose ester compositions that are readily dyed with cationic dyes by standard methods.

Another object of this invention is to provide shaped cellulose ester articles that can be readily dyed with cationic dyes.

A further object of this invention is to provide a method for imparting affinity for cationic dyes to shaped cellulose ester articles.

A still further object of this invention is to provide cellulose acetate fibers dyed with cationic dyes and which have excellent fastness toward light, laundering and dry-cleaning.

Preferably, these and other objects of this invention which will be apparent from the following description and claims, are accomplished by incorporating certain salts in cellulose esters prior to spinning, extrusion or other shaping operations.

In general, any of the lower acyl esters and mixed acyl esters of cellulose can be modified in accordance with the invention. Typical esters include cellulose acetate, cellulose propionate, cellulose butyrate, cellulose acetate propionate, cellulose acetate butyrate, etc. The cellulose acetate may be partially hydrolyzed acetone soluble type or it may be the triacetate type which is soluble in methylene chloride-methanol.

The cellulose ester compositions may contain plasticizers, pigments, fire-retarding agents, anti-oxidants, U.V. screening agents, etc. For example, cellulose acetate fibers may be spun from acetone dopes containing dispersed titanium dioxide and a dissolved alkyl sulfonic acid salt.

The salts are derived from an organic radical having a molecular weight of about 130 or higher and an acidic radical containing phosphorus or sulfur, for example, phosphate, phosphonate, sulfate or sulfonate radicals. These salts provide sites for the attraction and retention of basic dyes. These sites also impart affinity for some premetallized dyes. Fibers spun from the salt-containing dope can be readily dyed to heavy shades using conventional dyeing procedures. These dyed fibers exhibit excellent fastness to light, gas, laundering, dry-cleaning and crocking. They are readily processable on openers, pickers, cards, slubbers, spinning frames, looms, knitting machines and other textile machinery.

In most cases the modifying salts used in this invention are soluble in water. Hence, it would be expected that they would wash out of the fiber during the dyeing process or when the fiber is exposed to water under other conditions such as laundering. Surprisingly, I have found that the salt remains in the fiber under the usual conditions of processing. It was further surprising to find that the salt forms a stable complex with the dye molecules and this complex is fast toward laundering, dry cleaning and crocking.

The modifying salts of my invention, although they are only mechanically dispersed in the cellulose ester, function as though they were chemically combined in the cellulose molecule. It is thus apparent that my invention represents an entirely new concept in cellulose ester technology, that is, imparting affinity for cationic dyes by means of the above-mentioned salts.

As a preferred embodiment of my invention the above-mentioned objects are accomplished by incorporating in the cellulose ester dope to be rendered dyeable by cationic dyes a salt or mixture of two or more salts, or an oxyacid of sulfur or phosphorous having a dissociation constant greater than $10^{13}$ and represented by the general formula:

R-X-M

; wherein R represents an organic radical or radicals having a total molecular weight of about from 150 to 1,000, e.g., phenyl, naphthyl, anthryl, etc. radicals that may also be substituted by one or more alkyl, aryl or halogen substituents such as p-tert-butylphenyl, p-octylphenyl, dichlorophenyl, o-, m- or -phenyl-phneyl, 4-isopropylnaphthyl, etc. radicals, and generally similar radicals that may also contain heteroatoms such as N, O, or S, e.g., radicals of alkanedicarboxylic acid esters such as represented by dioctylsuccinic acid radicals, etc., X represents the acidic radial of the oxyacids of phosphorus or sulfur, and M represents an ion derived from an alkali metal, e.g., lithium, sodium, potassium, cesium, etc., ions, or an ion derived from an alkaline earth metal, e.g., zinc, cadmium, calcium, magnesium, etc., ions, an ammonium radical ($-NH_4$), or a molecule of an organic amine such as a primary, secondary or tertiary amine of from 1-20 carbon atoms, a heterocyclic amine such as pyridine, quinoline, piperidine, etc. The radical R may also contain ester groups having a hindered structure, for example, neopentyl structure such as described in Caldwell and Gilkey application Ser. No. 796,198, filed Mar. 2, 1959, (now abandoned). The radical R can also be polyvalent and may contain two or more acid radicals. The radical M can also represent aniline, N,N-dialkylanilines, etc.

More specifically, the preferred salt compounds of the invention may be defined as the alkali metal, alkaline earth metal, ammonium and organic amine salts of oxyacids of phosphorus and sulfur having dissociation constants greater than $10^{13}$ represented, for example, by phosphoric, phosphorous and phosphonic acids of the general structures:

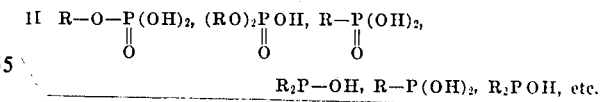

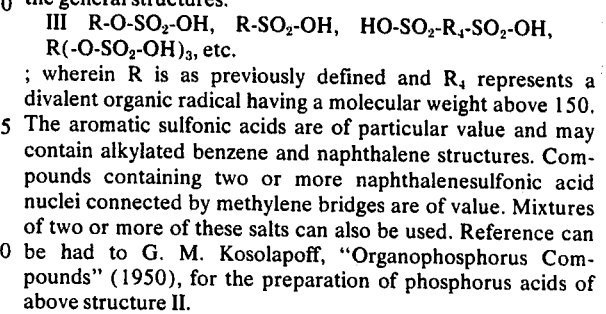

and acid sulfate and sulfonic acid derivatives represented by the general structures:

III   $R-O-SO_2-OH$,   $R-SO_2-OH$,   $HO-SO_2-R_4-SO_2-OH$,   $R(-O-SO_2-OH)_3$, etc.

; wherein R is as previously defined and $R_4$ represents a divalent organic radical having a molecular weight above 150. The aromatic sulfonic acids are of particular value and may contain alkylated benzene and naphthalene structures. Compounds containing two or more naphthalenesulfonic acid nuclei connected by methylene bridges are of value. Mixtures of two or more of these salts can also be used. Reference can be had to G. M. Kosolapoff, "Organophosphorus Compounds" (1950), for the preparation of phosphorus acids of above structure II.

Suitable salts coming within the structures I, II, and III include the potassium salt of di(p-tert-butylphenyl) phosphoric acid, the barium salt of di(o-tert-butylphenyl) phosphoric acid, the disodium salt of amylnaphthyl phosphoric acid, sodium diphenyl phosphate, sodium dodecylbenzenesulfonate, sodium salt of anthraquinone- -sulfonic acid, Aerosol OS(isopropyl) naphthalene sodium sulfonate), Aerosol MA (dihexyl sodium sulfosuccinate), Aerosol OT (dioctyl sodium sulfosuccinate), Nekal BA-75 (alkylnaphthalene sodium sulfonate), RWA 300 (monobutyl diphenyl sodium sulfonate), Alipal CO-433 (alkylphenoxypolyoxyethylene sodium sulfate), Alkanol S Flakes (sodium tetrahydronaphthalene sulfonate), Duponol ME (lauryl alcohol sulfate), Santomerse 1 (dodecylbenzene sodium sulfonate, dodecylbenzene lithium sulfonate, dodecylbenzene potassium sulfonate or dodecylbenzene barium sulfonate), ester from 2 moles of m-sulfobenzoic acid monolithium salt and 1 mole of 2,2,4,4-tetramethyl-1,3-cyclobutanediol, sodium salt of di(2,2,diethylamyl) ester of sulfosuccinic acid, the compound of the structure $KO-SO_2-O-(CH_2CH_2O)_{20}-SO_2-OK$, sodium salt of N,N-dioctylamide of o-sulfobenzoic acid, the lithium salt of N,N,N',N'-tetrahexylamide of sulfoisophthalic acid, Tamol SN(methylene polynaphthalene sodium sulfonate), Daxad No. 11 (a polymerized alkylated arene sodium sulfonate, sodium octadecyl sulfate, 2-naphthalene magnesium sulfonate, barium di(2-ethylhexyl) phosphate, monobutyl biphenyl sodium sulfonate, naphthalene calcium sulfonate, sodium salt of di(2,2-dimethylhexyl) ester of 5-sulfoisophthalic acid, and the like. Many of these salts as indicated are commercially available in the form of anionic surfactants and detergents. A detailed list of such compounds is given in the book "Detergents and Emulsifiers," J. W. McCutcheon, Morristown, New Jersey (1962).

As indicated above in accordance with my invention, from 0.1 to 25 percent by weight and preferable 1 to 10 percent, based on the weight of the total composition, the salt compound is incorporated in the cellulose ester. The salt may be added to or incorporated in the cellulose ester by various methods. In the spinning of fibers, for example, the salt may be added to the spinning dope. Preferably, the salt is chosen to be soluble in the spinning solvent. Dopes of this type are readily spun and present no difficulties in filtration. When the salt is insoluble in the spinning solvent it must be used in the form of particles that are small enough to pass through the filters and spinnerets. This usually requires a particle size of about 2 microns or less.

In the manufacture of extruded sheets, tubes, rods, etc., the salt may be mixed with the cellulose ester and plasticizer in the standard types of equipment such as hot rolls, sigma-blade mixers, etc. In the manufacture of protective coatings, the salt can be dissolved or dispersed along with the cellulose ester in the solvent. Some of the cationic or basic dyes that are useful in the practice of this invention include Sevron Blue (C.I. No. Basic Blue 21), Sevron Brilliant Red 4G (C.I. No. Basic Red 14), Sevron Green B (C.I. No. Basic Green 3), Sevron Yellow L (C.I. No. Basic Yellow 13), Auramine SP (C.I. No. Basic Yellow 2), Calcozine Orange RS (C.I. No. Basic Orange 1), Rhodamine 5G (C.I. No. Basic Red 1), Bismarck Brown (C.I. No. Basic Brown 1) and Methyl Violet (C.I. No. Basic Violet 1).

The following examples will serve further to illustrate the manner whereby I practice my invention:

EXAMPLE 1

A. A film of cellulose acetate containing 5 percent of the sodium salt of dioctyl sulfosuccinate is cast from acetone solution. The film is dyed to a heavy shade with 3 percent Sevron Brilliant Red 4G (C.I. No. Basic Red 14) and Maxilon Blue 5G (C.I. No. Basic Blue 3) (C.I. No. 51005). The film is clear and the dyes show excellent fastness to light and laundering. The film is useful for the manufacture of signs.

B. The esters of sulfosuccinic acid are of particular value in the practice of the invention because they are soluble in the solvents commonly used for cellulose esters such as acetone and methylene chloride-methanol. Other suitable esters include the dihexyl, diamyl, dibutyl, dicyclohexyl and dilauryl derivatives. The sodium, lithium and potassium salts can be used.

EXAMPLE 2

A film of cellulose acetate containing 3 percent sodium dodecylbenzenesulfonate is cast from a solvent consisting of 75 percent acetone- 25 percent methanol. The film will dye to a heavy shade with a variety of cationic dyes.

EXAMPLE 3

A. A film of cellulose triacetate (43.5 percent acetyl) containing 5 percent by weight of the sodium salt of acetone—sulfosuccinate is cast from a solvent composed of 90 methylene chloride—10 methanol. The clear film dyes to a heavy 4with Sevron Brilliant Red 4 G (C.I. No. Basic Red 14) and Maxilon Blue 5G (C.I. No. Basic Blue 3) (C.I. No. 51005). The color will show excellent fastness toward light and soapy water.

B. This film is dyed without the use of swelling agents (dye carriers) or super-atmospheric pressure.

EXAMPLE 4

A. Fibers of cellulose triacetate (43.6 acetyl) containing 5 percent by weight of the sodium salt of dihexyl sulfosuccinate are dry-spun from a solvent composed of 90 methylene chloride—10 methanol. The fibers have normal physical properties.

B. Using a standard procedure the fibers are dyed with the following cationic dyes:

Sevron Blue B (C.I. No. Basic Blue 21)
Sevron Brilliant Red 4G (C.I. No. Basic Red 14)
Sevron Green B (C.I. No. Basic Green 3)
Sevron Yellow L (C.I. No. Basic Yellow 13)
Calcozine Orange RS (C.I. No. Basic Orange 1) (C.I. No. 11320)
Maxilon Orange GA (C.I. No. Basic Orange 21) (C.I. No. 48035)
Bismarck Brown (C.I. No. Basic Brown 1) (C.I. No. 2100)

C. Deep shades are obtained, using 4 percent dye, calculated on the weight of the fiber. In most cases, the fastness toward light, laundering and dry-cleaning is excellent.

EXAMPLE 5

Cellulose acetate fibers containing 5 percent of the sodium salt of dioctyl sulfosuccinate are dry-spun from acetone solution. They are dyed to deep shades with the cationic dyes listed in example 4. The colors have excellent fastness toward light, laundering, and dry-cleaning.

EXAMPLE 6

Cellulose acetate fibers containing 3 percent of the sodium salt of dihexyl sulfosuccinate are dry-spun from acetone solution. They dye well with a variety of cationic dyes. Similar results are obtained at 1.0 and 2.0 percent concentrations of the salt. In the range of 0.1 to 0.5 percent salt, the shades are somewhat lighter but the fibers dye more heavily than the control which contains no salt. Fibers containing 15 percent of the salt dye very heavily.

EXAMPLE 7

A. Cellulose acetate fibers are spun containing 8 percent of the compound:

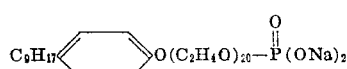

The fibers dye well with cationic dyes.

B. Similar results are obtained when the phosphate salt is incorporated in fibers made from cellulose triacetate, cellulose tripropionate and cellulose acetate propionate. Fibers containing 20 percent of the salt dye very heavily.

EXAMPLE 8

A. One-hundred parts of potassium diisopropyl-naphthalene-sulfonate and 200 parts of diethyl phthalate are ball milled to form a fine dispersion of the salt. Two parts of cellulose acetate butyrate and 1.5 parts of the dispersion are mixed on the hot rolls to form a smooth sheet. The sheet is granulated and molded. The molded pieces are readily dyed with cationic dyes.

B. The dispersion is used in a similar manner to plasticize cellulose acetate and cellulose acetate propionate.

EXAMPLE 9

A mixture of mono- and dioctadecylphosphoric acids is produced by treating octadecyl alcohol with $P_2O_5$ according to known methods. The product is converted to the lithium salt. One-hundred parts of butyl acetate and 15 parts of the salt are ball milled to form a fine dispersion. The dispersion is used as a solvent to formulate lacquers from cellulose acetate, cellulose acetate propionate, cellulose acetate butyrate and cellulose butyrate. The lacquers contain from 0.2 to 4 percent salt, based on the cellulose ester. Protective coatings made from these lacquers will dye well with cationic dyes.

EXAMPLE 10

A. Cellulose acetate fibers are spun containing 3 percent of the following salts:

disodium naphthylphosphonate
lithium diphenylphosphonate
disodium dodecylbenzenephosphonate
potassium dihexyl phosphite
sodium diamyl phosphonite
sodium di(p-tert-butylphenyl) phosphate
lithium di(o-tert-butylphenyl) phosphate B. The fibers dye well with cationic dyes.

C. These salts are effective when used in 1.0 to 3.0 percent concentration in cellulose triacetate fibers.

EXAMPLE 11

A. Cellulose acetate fibers are spun containing 2 to 4 percent of the following salts:

monobutyl biphenyl sodium sulfonate
sodium tetrahydronaphthalene sulfonate
lauryl alcohol sulfate, sodium salt
magnesium dodecylbenzene sulfonate
calcium naphthalene sulfonate
sodium salt of condensation product of formaldehyde and naphthalenesulfonic acid
lithium octadecylsulfonate
tributylamine salt of butylnaphthalenesulfonic acid
pyridine salt of oleyl phosphoric acid Other amine salts of the phosphoric acid can be used, such as, N,N-diethylcyclohexylamine. By substituting any of the mentioned amine salt compounds for the salts specified in any of the preceding examples, generally similar modified cellulose esters that are readily dyeable with cationic dyes are obtained.

Although the invention has been described in considerable detail with particular reference to certain preferred embodiments thereof, variations and modifications can be effected within the spirit and scope of the invention as described hereinbefore and as defined in the appended claims.

We claim:

1. A cellulose ester fiber dyeable with cationic dyes having dispersed therein from 1–10 percent by weight, based on the weight of the cellulose ester, of dihexyl sodium sulfosuccinate.

2. The fiber of claim 1 wherein cellulose ester is selected from the group consisting of cellulose triacetate and cellulose tripropionate.

3. The fiber of claim 1 wherein the cellulose ester is cellulose acetate.

4. The fiber of claim 3 wherein the fiber contains about 3 percent by weight dihexyl sodium sulfosuccinate.

5. A cellulose ester fiber dyed with a cationic dye having dispersed therein from 1–10 percent by weight, based on the weight of the cellulose ester, of dihexyl sodium sulfosuccinate.

6. The fiber of claim 5 wherein cellulose ester is selected from the group consisting of cellulose triacetate and cellulose tripropionate.

7. The fiber of claim 5 wherein the cellulose ester is cellulose acetate.

8. The fiber of claim 7 wherein the fiber contains about 3 percent by weight dihexyl sodium sulfosuccinate.

* * * * *